UNITED STATES PATENT OFFICE.

GEORGE W. FRANCIS, OF MIDDLETOWN, CONNECTICUT.

MANUFACTURE OF STEEL CASTINGS.

SPECIFICATION forming part of Letters Patent No. 276,018, dated April 17, 1883.

Application filed October 5, 1882. (No specimens.)

*To all whom it may concern:*

Be it known that I, GEORGE W. FRANCIS, of Middletown, in the county of Middlesex and State of Connecticut, have invented certain new and useful Improvements in the Manufacture of Steel Castings; and I do hereby declare that the following is a full, clear, and exact description of the invention, which will enable others skilled in the art to which it appertains to make and use the same.

Heretofore many attempts have been made to make steel castings; but, so far as I am aware, the result has been a failure, not only for the reason that steel of a good grade cannot be melted and poured into molds and produce castings with sharply-defined angles, corresponding with the angles of the molds, but also the quality of the steel itself after it has been melted and poured into molds becomes greatly deteriorated. Furthermore, on account of the difficulty of melting and pouring steel of a good grade, a poor grade of steel has generally been selected for this purpose, because the latter will melt and pour more readily than the former.

I have discovered that steel, even of the best quality, if melted in conjunction with charcoal pig-iron, as hereinafter explained, will form a mixture which is sufficiently fluid to be run into and take the exact form of the mold, while the quality of the steel will not be impaired for even such high uses, for example, as cutting-tools; and my invention consists in melting steel which is rich enough in carbon to be hardened and tempered, in conjunction with charcoal pig-iron, pouring such fluid molten mixture into any desired form of molds, and then annealing the metal so cast.

To carry my invention into effect I take scrap tool-steel—such as old files, old dies—and Lake Superior charcoal pig-iron or other charcoal-iron of like character, and preferably place the iron in the bottom of a crucible and the steel on the top, the same being in proportions varying from three parts of the steel and one of the iron to one part of the steel and four of the iron, according to the quality of steel castings to be produced, the smallest amount of iron with the largest amount of steel producing the best steel for most purposes; but these proportions may be varied somewhat. Especially can a larger proportion of the iron be added when the use for which the casting is designed will admit. The castings thus produced are annealed, after which they are ready for use. Prior to the annealing the metal cannot be rolled or hammered with good results when either cold or hot. I have found that three parts of steel and one part of charcoal pig-iron thus placed in a crucible, even when the best of refined steel is used, will readily melt at a white heat, the iron first melting, and the steel melting soon thereafter and falling down into the crucible with the iron commingles therewith, forming a molten metal which may be readily poured into ordinary sand molds. It is also found that this compound runs very freely, so as to produce sharp and well-defined castings, even of a very small size, which are free from flaws or blow-holes, are of a fine and homogeneous structure, and which, after annealing, may be refined by rolling or hammering while hot, and may be hammered for any purpose when cold. When finely polished my new steel closely resembles nickel, and is very free from all tendency to oxidize. Said castings, unless a larger proportion of iron is employed than that hereinbefore specifically stated, are also capable of being hardened and tempered by merely heating and immersing in water or other liquid, the same as other steel.

I prefer to use scrap-steel composed of old tools, because such steel is generally of a superior quality, and can be obtained cheaply; but bar-steel or other steel which will harden and temper may be used, if desired, with good effect.

I do not wish to limit myself to producing this steel in crucibles, as I contemplate the employment of furnaces for that purpose.

In carrying out my process I put no manganese or anything else into the crucible except the iron and steel before mentioned, and I put nothing else into the furnace except the fuel.

If desired, instead of first pouring it into molds for shaping it into its final form, it may first be run into ingot-molds, and the ingots thus produced may be remelted and run into molds for shaping the desired article or articles. For edge-tools—such as axes, chisels, &c.—I prefer to cast the article into substantially the desired form, and afterward the cutting-blades of such edge-tools may be heated and hammered to refine and toughen them, after which they are hardened and tempered in any ordinary manner.

I am aware that Bessemer steel and common cast-iron have been melted and puddled, and I hereby disclaim the same. I have tried to melt steel in conjunction with various kinds of iron, but have never yet found anything but charcoal pig-iron which can be mixed with steel for casting and produce the results hereinbefore specified.

Having fully described my invention, what I claim, and desire to secure by Letters Patent, is—

The method of producing manufactures of steel which consists in melting steel and charcoal pig-iron in the proportions set forth, pouring the same into molds, and finally annealing to produce manufactures of steel which can be hammered, hardened, and tempered, substantially as described.

GEORGE W. FRANCIS.

Witnesses:
J. O. MEDBERY,
IRA E. HICKS.